US010448411B1

(12) United States Patent
Jorgovanovic

(10) Patent No.: US 10,448,411 B1
(45) Date of Patent: Oct. 15, 2019

(54) SYSTEM FOR DETERMINING OPTIMAL ANTENNAE FOR WIRELESS COMMUNICATION

(71) Applicant: AMAZON TECHNOLOGIES, INC., Seattle, WA (US)

(72) Inventor: Milos Jorgovanovic, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 322 days.

(21) Appl. No.: 15/198,095

(22) Filed: Jun. 30, 2016

(51) Int. Cl.
*H04W 72/08* (2009.01)
*H04L 12/26* (2006.01)
*H04W 4/02* (2018.01)
*H04W 76/16* (2018.01)
*H04W 4/80* (2018.01)

(52) U.S. Cl.
CPC ....... *H04W 72/085* (2013.01); *H04L 43/0829* (2013.01); *H04L 43/16* (2013.01); *H04W 4/025* (2013.01); *H04W 4/80* (2018.02); *H04W 76/16* (2018.02)

(58) Field of Classification Search
CPC .... H04B 1/18; H04B 7/02; H04B 7/04–0404; H04B 7/0456; H04B 7/0602; H04B 7/0686–0693; H04B 7/0608; H04B 7/061; H04W 72/085; H04W 4/80; H04W 76/16; H04L 43/0829; H04L 43/16
See application file for complete search history.

(56) References Cited

U.S. PATENT DOCUMENTS

| 2004/0203347 | A1* | 10/2004 | Nguyen | H04B 7/0691 455/13.3 |
| 2004/0204105 | A1* | 10/2004 | Liang | H04B 7/0608 455/562.1 |
| 2005/0063343 | A1* | 3/2005 | Hoffmann | H04B 7/0408 370/334 |
| 2005/0148306 | A1* | 7/2005 | Hiddink | H04B 7/0608 455/101 |
| 2009/0252236 | A1* | 10/2009 | Li | H04B 7/061 375/260 |
| 2010/0262885 | A1* | 10/2010 | Cheng | H04L 1/0035 714/749 |

(Continued)

Primary Examiner — Un C Cho
Assistant Examiner — Kenan Cehic
(74) Attorney, Agent, or Firm — Lindauer Law, PLLC

(57) ABSTRACT

Described are techniques for determining optimal antennae for use by wireless radios that share communication resources, such as a radio frequency chain. When communication is initiated using a first wireless radio of a communication device having at least two antennae, configuration data for the first wireless radio may indicate a default antenna. When communication is not taking place using the default antenna, an alternate antenna may be used to communicate test data. Signal strength data for communication by each antenna may be used to determine the default antenna indicated by the configuration data. When communication is initiated using a second wireless radio, separate configuration data for the second technology may indicate a default antenna. Separate signal strength data for communications, by the second wireless radio, using each antenna may determine the default antenna indicated by the configuration data.

20 Claims, 6 Drawing Sheets

(56) References Cited

U.S. PATENT DOCUMENTS

| | | | |
|---|---|---|---|
| 2013/0222515 A1* | 8/2013 | Abuan | H04N 7/14 |
| | | | 348/14.01 |
| 2013/0267181 A1* | 10/2013 | Ayatollahi | H01Q 1/243 |
| | | | 455/73 |
| 2013/0343310 A1* | 12/2013 | Ghassemzadeh | H04B 7/061 |
| | | | 370/329 |
| 2014/0079155 A1* | 3/2014 | Wang | H04B 7/0617 |
| | | | 375/299 |
| 2014/0273884 A1* | 9/2014 | Mantravadi | H04B 1/38 |
| | | | 455/73 |
| 2015/0222316 A1* | 8/2015 | Ibrahim | H01Q 21/29 |
| | | | 455/78 |
| 2015/0245316 A1* | 8/2015 | Ali | H01Q 1/243 |
| | | | 455/552.1 |
| 2016/0182118 A1* | 6/2016 | Lam | H03H 2/005 |
| | | | 455/78 |
| 2016/0276983 A1* | 9/2016 | Vaillancourt | H03F 3/195 |
| 2016/0381660 A1* | 12/2016 | Mittal | H04W 4/026 |
| | | | 455/421 |
| 2017/0187198 A1* | 6/2017 | Leabman | H02J 5/005 |
| 2018/0062718 A1* | 3/2018 | Clevorn | H04B 7/04 |

* cited by examiner

SYSTEM FOR DETERMINING OPTIMAL ANTENNAE FOR WIRELESS COMMUNICATION

BACKGROUND

Wireless devices may include multiple antennae for transmitting and receiving data. Characteristics of each antenna, such as the radiation pattern, gain and power capabilities, and so forth, may affect the performance of the wireless device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
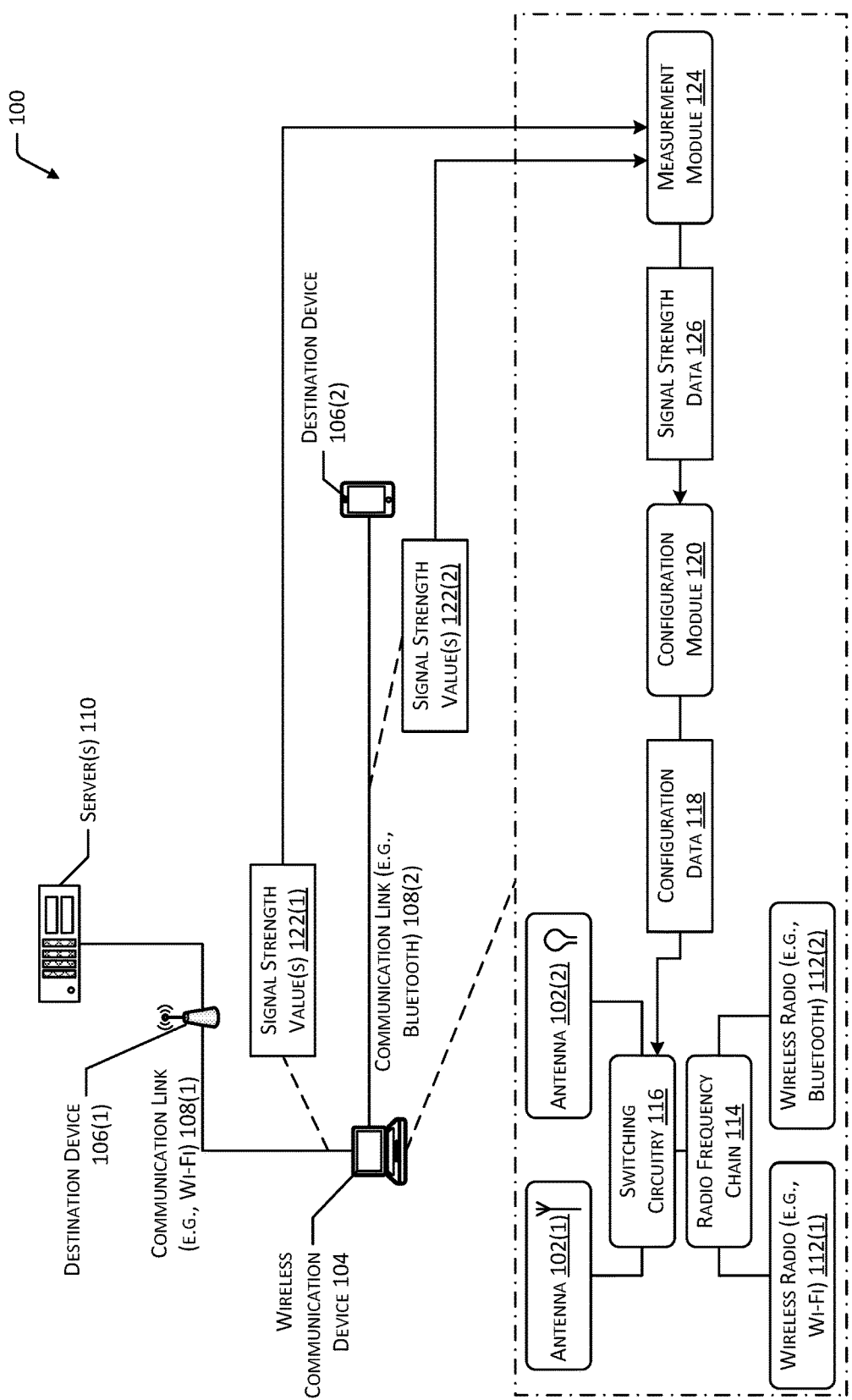
FIG. 1 depicts an implementation of a system for determining antennae for use with particular wireless technologies.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Wireless devices, such as devices having a communication chipset that uses a Wi-Fi protocol, may include multiple antennae and switching circuitry for selectively transmitting or receiving data using a particular antenna. Different antennae may have different characteristics, such as differing radiation patterns, which affect the directional (e.g., angular) dependence of the strength of signals received by the antenna or transmitted using the antenna. For example, a wireless device may include a first antenna having a generally omnidirectional radiation pattern and a second antenna having a radiation pattern with a significant directional component. Depending on the location of an access point relative to the wireless device, a greater signal strength may be observed when using a particular antenna.

Some wireless communication chipsets may be configured to communicate using multiple wireless technologies (e.g., protocols). Such technologies may include, without limitation, Wi-Fi, Wi-Fi Direct, Bluetooth, Bluetooth Low Energy, Z-Wave, one or more protocols that correspond at least in part to section 802.15.4 of the specifications set forth by the Institute of Electrical and Electronics Engineers (IEEE), such as ZigBee, Thread, or 6LowPAN, and so forth. For example, a particular chipset may include a first wireless radio that communicates using a Wi-Fi protocol and a second wireless radio that communicates using a Bluetooth protocol. The chipset may include a single radio frequency (RF) chain, which may include various conductors and devices (e.g., transmitters, receivers, filters, cables, amplifiers, attenuators, measurement instruments, and so forth), that are shared by both wireless technologies. The chipset may also include multiple antennae, each antenna having a particular radiation pattern or other characteristics unique from other antennae. For example, depending on the location of the device containing the wireless communication chipset relative to a Wi-Fi access point, a greater signal strength may be observed when using a particular antenna. The particular antenna may be used by the device as a default antenna when communicating data using a Wi-Fi protocol. However, the particular antenna that achieves an optimal signal strength when communicating using a Wi-Fi protocol may be suboptimal when communicating data using a different wireless technology, such as a Bluetooth protocol.

Described in this disclosure are techniques for determining the optimal antennae for use with multiple wireless technologies that share common resources, such as single RF chain. When a wireless radio using a first wireless technology is used to send or receive data, configuration data associated with the first wireless technology may be accessed to determine the current default antenna associated with that technology. For example, a device may include two antennae, and the configuration data may indicate that the first antenna is the current default antenna when communicating data using a Wi-Fi protocol. When data is sent or received using the first antenna, a signal strength value, such as a signal-to-noise ratio (SNR), associated with the communication may be determined. In cases where noise may not be determined, the signal strength value may include a Received Signal Strength Indicator (RSSI). In some implementations, such as when communicating using a Wi-Fi protocol, the signal strength value may include an indication of a Modulation and Coding Scheme (MCS) or physical data rate associated with data transfer using the Wi-Fi communication. The signal strength value may be stored as first signal strength data, which may include previous signal strength values associated with communication using the first wireless technology and the first antenna. For example, the first signal strength data may include a moving average, determined based on the ten previous signal strength values determined when using the first wireless technology and the first antenna.

When communication of data using the first antenna is complete, such as after a threshold length of time has passed without the exchange of data using the first antenna, switching circuitry may be used to select the second antenna. The wireless radio associated with the first wireless technology may then use the second antenna to transmit test data, such as a probe request if communicating using a Wi-Fi protocol. The signal strength value associated with the first wireless technology when using the second antenna may be determined and stored as second signal strength data, which may include previous signal strength values associated with communication using the first wireless technology and the second antenna. Test data may be sent using the second antenna, and a signal strength value may be recorded, periodically, based on a selected time period, such as every 100 milliseconds. In some implementations, if it is determined that a device is moving, such as through use of an accelerometer or other type of motion sensor, the selected time period may be decreased based on the rate of movement of the device. For example, the optimal antenna for a wireless technology may change more frequently when a device is moving rapidly, and may change only infrequently when a device is stationary. In other implementations, the time period associated with sending of test data and receiving of a signal strength value may be based on the rate of change associated with the signal strength value for one or multiple antennae. For example, if the signal strength value associated with the first antenna or second antenna, measured at a second time, differs from the value measured at a first time by more than a threshold value, the time period at which the test data is periodically sent may be decreased. As another example, the period of time may be determined based on a rate of change calculated using a fixed count of previous signal strength values.

The first signal strength data and the second signal strength data may be used to determine possible modifications to the configuration data for the first wireless technology. For example, if a wireless device or an access point has been moved from a previous position, the first antenna may no longer attain a greater signal strength than the second antenna when communicating using a Wi-Fi protocol. Overtime, the moving average or other value determined based on the first signal strength data may decrease relative to the value based on the second signal strength data. If the second signal strength data indicates a value greater than the value based on the first signal strength, the configuration data for the first wireless technology may be modified to instead indicate the second antenna as the default antenna. In some implementations, the difference between the value indicated by the second signal strength data and that indicated by the first signal strength data may exceed a constant (e.g., an offset value) before modifying the configuration data, to prevent hysteresis caused by rapid switching between default antennae.

When a second wireless technology is used to send or receive data, configuration data associated with the second wireless technology may be used to determine the current default antenna associated with the wireless technology. For example, the second wireless technology may include a Bluetooth protocol, and the default antenna for use with the Bluetooth protocol may include the same antenna used for the first wireless technology or a different antenna. As another example, both the first and second wireless technology may include use of the same protocol to establish a communication link, but the communication links may have different characteristics. For example, a first wireless technology may include communication using a Wi-Fi band of 2.4 gigahertz, while a second wireless technology includes communication using a Wi-Fi band of 5 gigahertz. As another example, the first and second wireless technologies may each include use of a Bluetooth protocol to communicate with different devices.

When data is sent or received using the default antenna for the second wireless technology, a signal strength value, such as SNR or RSSI value associated with the communication may be determined. In some implementations, such as when communicating using a Bluetooth protocol, the signal strength value may include an indication of a retransmission rate associated with data transfer using the Bluetooth communication. The signal strength value may be stored as third signal strength data, which may include previous signal strength values associated with communication using the second wireless technology and the current default antenna.

When communication by the second wireless technology using the current default antenna is complete, switching circuitry may be used to select an alternate antenna. The second wireless technology may then use the alternate antenna to transmit test data. The signal strength value associated with use of the second wireless technology and the alternate antenna may be determined and stored as fourth signal strength data, which may include previous signal strength values associated with communication using the second wireless technology and the alternate antenna. In some implementations, test data may be sent using the alternate antenna, and a signal strength value may be recorded, periodically, based on a selected time period, such as every 100 milliseconds.

The third signal strength data and the fourth signal strength data may be used to determine possible modifications to the configuration data for the second wireless technology. For example, if a Bluetooth device has been moved from a previous position, such as in the case of a mobile or portable Bluetooth device, or if one or more objects have been positioned between devices, the current default antenna may no longer attain a greater signal strength than the alternate antenna when communicating using a Bluetooth protocol. Over time, the moving average or other value determined based on the third signal strength data may decrease relative to the value based on the fourth signal strength data, which may result in modification of the configuration data for the second wireless technology to indicate the alternate antenna as a new default antenna. If the value based on the third signal strength data remains greater than the value based on the fourth signal strength data, the configuration data that indicates the current default antenna may remain unmodified.

In some implementations, if a communication is initiated using a default antenna and the communication fails, which may be indicated, for example, by a count of dropped packets or packets for which no response is received exceeding a threshold count for at least a threshold length of time, measuring of the signal strength value may not be possible. In such cases, the signal strength value may be assigned a fixed value, such as −100 decibel-milliwatts (dBm), which may be stored as signal strength data. The impact of the fixed value on the signal strength data may increase the likelihood that the configuration data will be modified to change the current default antenna for the current wireless technology. For example, the signal strength data may be used to determine a moving average based on the previous fifteen signal strength values. If the oldest signal strength value is replaced with a fixed value of −100, this may decrease the moving average relative to the signal strength data for a different antenna. In some implementations, the configuration data for the current wireless technology may be modified upon determination that the communication has failed, that the data transfer rate for the communication has fallen below a threshold minimum, or that a count of dropped or erroneous packets has exceeded one or more thresholds. For example, if a wireless device or an access point has been moved a considerable distance since a previous access, the subsequent access attempt may be unsuccessful, or a poor data transmission rate that is less than a threshold minimum value, may be observed. Based on this determination, an alternate antenna may be used to complete the communication, and the configuration data may be modified to indicate the alternate antenna as a new default antenna.

In some implementations, data acquired using other sensors from a device, such as a location sensor, may be stored in conjunction with signal strength data. For example, a greater signal strength value may be observed for a first antenna at a first location, while a greater signal strength value may be observed for a second antenna at a second location. Selection of a default antenna for use may be affected by a current location of the device. In other implementations, signal strength data may be shared with other devices, such as by providing the signal strength data to a centralized repository. For example, the signal strength values determined at a particular location using a first device may be relevant with regard to a second device having identical or similar components that is positioned at or near the particular location.

Implementations described herein may therefore enable efficient switching between antennae based on a wireless technology currently being used to transmit or receive data, by storing configuration data for each wireless technology and signal strength data for each combination of a wireless technology and an antenna. Based on the relative signal strength data associated with a wireless technology, for various antennae, an optimal antenna may be determined at any particular time, and the configuration data for the wireless technology may be modified to indicate the optimal antenna.

FIG. 1 depicts a system 100 for determining antennae 102 for use with particular wireless technologies. A wireless communication device 104 may be configured to communicate with particular destination devices 106 using different wireless technologies. For example, the wireless communication device 104 may include a computing device that communicates with a first destination device 106(1), such as a wireless access point, via a Wi-Fi communication link 108(1). Continuing the example, the wireless communication device 104 may communicate with the first destination device 106(1) using a Wi-Fi protocol that corresponds at least in part to section 802.11 of the specifications set forth by the IEEE. The wireless communication device 104 may also communicate with a second destination device 106(2) via a second communication link 108(2), such as a Bluetooth communication link 108(2). Continuing the example, the wireless communication device 104 may communicate with the second destination device 106(2) using a Bluetooth protocol that corresponds at least in part to section 802.15.1 of the IEEE specifications or one or more of the specifications set forth by the Bluetooth Special Interest Group. In other implementations, the wireless communication device 104 may be configured to communicate using other wireless technologies, such as Wi-Fi Direct, Bluetooth Low Energy, ZigBee, Thread, Long Term Evolution (LTE), LTE-Advanced, Code Division Multiple Access (CDMA), Wideband CDMA, Z-wave, and so forth. While in the example described above, the wireless communication device 104 is configured to communicate using two different wireless protocols (e.g., Wi-Fi and Bluetooth), in other implementations, the wireless communication device 104 may be configured to communicate with multiple destination devices 106 using the same communication protocol. For example, the wireless communication device 104 may communicate with two different destination devices 106 using two different Bluetooth communication links 108. In other implementations, the wireless communication device 104 may communicate with the same destination device 106 using different communication protocols. For example, the wireless device 104 may selectively communicate with a destination device 106, such as an access point, using different Wi-Fi bands, such as a 2.4 gigahertz band and a 5 gigahertz band.

The wireless communication device 104 and the destination devices 106 may include any type of computing device including, without limitation, laptop computers or other personal computers, smartphones or other mobile devices, audio or video devices, device controllers, set-top boxes, tablet computers, wearable computers, automotive computers, access points, servers, and so forth. For example, the wireless communication device 104 may include a laptop computer that accesses the Internet to communicate with one or more servers 110 via a Wi-Fi connection with the first destination device 106(1). The second destination device 106(2) may include a smartphone or another type of computing device configured for Bluetooth communication with the wireless communication device 104.

The wireless communication device 104 may include a wireless communication chipset or a similar component configured to establish wireless communication with other devices. For example, FIG. 1 depicts the wireless communication device 104 including a first wireless radio 112(1) and a second wireless radio 112(2). Each wireless radio 112 may be configured to communicate using a different wireless technology. For example, the first wireless radio 112(1) may communicate using a Wi-Fi protocol, while the second wireless radio 112(2) communicates using a Bluetooth protocol. As described previously, in some implementations, both wireless radios 112 may communicate using the same communication protocol. Communications by the wireless radios 112 may share common components of the wireless communication device 104, such as a radio frequency chain 114 accessed by both wireless radios 112. The radio frequency chain 114 may include any number and any type of conductor or device, such as one or more transmitters, receivers, cables, amplifiers, attenuators, measurement instruments, loads, and so forth, that may be used to conduct signals between the wireless radios 112 and one or more antennae 102. In some implementations, components of the radio frequency chain 114 may modify the signals during conduction thereof.

The wireless communication device 104 may include multiple antennae 102. For example, FIG. 1 depicts the wireless communication device 104 including a first antenna 102(1) and a second antenna 102(2). Each antenna 102 may include a different radiation pattern or other characteristics. For example, the first antenna 102(1) may include a generally omnidirectional radiation pattern while the second antenna 102(2) includes a directional radiation pattern. Switching circuitry 116 in the wireless communication device 104 may control whether a signal is transmitted or received using the first antenna 102(1) or the second antenna 102(2). In other implementations the wireless communication device 104 may include multiple wireless chipsets, radio frequency chains 114, and so forth, that share one or more of common switching circuitry 116 or common antennae 102. In some cases, a greater signal strength may be observed, when communicating data using the first wireless radio 112(1), if the first antenna 102(1) is used. In other cases, a greater signal strength may be observed if the second antenna 102(2) is used. For example, a Wi-Fi access point may be positioned in a location that is outside of the directional pattern of the second antenna 102(2), but within the omnidirectional pattern of the first antenna 102(1), causing a greater signal strength to be observed if the first antenna 102(1) is used for Wi-Fi communications with the access point. However, the second antenna 102(2) may be optimal for use with Bluetooth communications. For example, the second destination device 106(2) may be within the directional pattern of the second antenna 102(2), such that a greater signal strength is observed if the second antenna 102(2) is used to communicate with the second destination device 106(2), rather than the first antenna 102(1). Configuration data 118 stored in data storage associated with the wireless communication device 104 may indicate a particular antenna 102 for use with each of the wireless radios 112. For example, the configuration data 118 may indicate that the first antenna 102(1) is to be used when data is communicated using the first wireless radio 112(1) and the second antenna 102(2) is to be used when data is communicated using the second wireless radio 112(2). As another example, the configuration data 118 may indicate that the same antenna 102 is to be used when data is communicated using either of the wireless radios 112. A configuration module 120 may be used to modify the configuration data 118 and to control the switching circuitry 116. In other implementations, the switching circuitry 116 may directly access the configuration data 118 to determine the manner in which to route particular signals. For example, the switching circuitry 116 may include a hardware processor, or a hardware processor of the wireless communication device 104, which may control the switching circuitry 116 based on the configuration data 118. While FIG. 1 depicts the configuration data 118 and configuration module 120 stored in association with the wireless communication device 104, in other implementations, one or more of the configuration data 118 or the configuration module 120 may be stored in a device remote to the wireless communication device 104 and in communication therewith, such as a server 110.

The configuration module 120 may modify the configuration data 118 based on the observed signal strength of the communication links 108 with destination devices 106. For example, the first wireless radio 112(1) may be used to establish a communication link 108(1) with the first destination device 106(1) using a first wireless technology, such as a Wi-Fi protocol. The first antenna 102(1) may be used to exchange data between the wireless communication device 104 and the first destination device 106(1). A signal strength value 122(1) indicative of a signal strength of the communication may be determined, such as by a measurement module 124 associated with the wireless communication device 104. After communication using the first antenna 102(1) is complete, the switching circuitry 116 may be actuated to begin communicating data using the second antenna 102(2), and test data, such as a probe request packet, may be provided using the second antenna 102(2). In some implementations, completion of the communication using the first antenna 102(1) may be determined based on a lapse of a threshold length of time during which no data packets are sent or received using the first antenna 102(1). The measurement module 124 may also determine a signal strength value 122(1) associated with communication by the first wireless radio 112(1) using the second antenna 102(2). In some implementations, signal strength values 122 for the non-default antenna 102 may be determined periodically, such as once every one hundred milliseconds.

The measurement module 124 may determine signal strength data 126 based on the signal strength values 122 determined using each of the antennae 102. For example, the signal strength data 126 may include a fixed count of signal strength values 122(1) for each antenna 102 used by the first wireless radio 112(1). Continuing the example, the signal strength data 126 may be used to calculate a first average value (e.g., a mean, mode, or median) based on the ten most recent signal strength values 122(1) associated with the first wireless radio 112(1) and first antenna 102(1) and a second average value based on the ten most recent signal strength values 122(1) associated with the first wireless radio 112(1) and the second antenna 102(2). In other implementations, the signal strength data 126 may be used to determine other mathematical values based on the signal strength values 122. For example, the signal strength data 126 may be used to calculate a weighted average based on the ten most recent signal strength values 122 in which signal strength values 122 determined more recently are provided with a greater weight than signal strength values 122 determined less recently.

The configuration module 120 may modify the configuration data 118 based on the signal strength data 126. For example, the configuration data 118 may indicate that the current default antenna 102 used in conjunction with the first wireless radio 112(1) is the first antenna 102(1). The default antenna 102 may be determined as a preexisting default or based on previous signal strength data 126. For example, greater signal strength values 122(1) may be observed when the first antenna 102(1) is used in conjunction with the first wireless radio 112(1) when compared to the second antenna 102(2). However, one or more factors associated with the wireless communication device 104 or the first destination device 106(1) may change, resulting in different observed signal strength values 122(1) for each antenna 102. For example, a user may move the wireless communication device 104 or the first destination device 106(1) to a different location or place one or more objects between the wireless communication device 104 and the first destination device 106(1), which may affect the signal strength values 122(1) associated with use of the first antenna 102(1). Over time, the signal strength data 126 associated with the first antenna 102(1) may indicate a lower average or other mathematical value, while the signal strength data 126 associated with the second antenna 102(2) may increase, remain constant, or decrease at a rate less than that of the first antenna 102(1). If the signal strength data 126 indicates a greater value associated with the second antenna 102(2), the configuration module 120 may modify the configuration data 118 to indicate the second antenna 102(2) as a default antenna 102 for use with the first wireless radio 112(1). On subsequent occasions when the first wireless radio 112(1) communicates data, the switching circuitry 116 may be actuated to select the second antenna 102(2) based on the modified configuration data 118.

The configuration data 118 may indicate the same antenna 102 or a different antenna 102 as the default antenna 102 for use in conjunction with the second wireless radio 112(2). When the second wireless radio 112(2) communicates data to the second destination device 106(2), the switching circuitry 116 may be actuated to select the default antenna 102 based on the configuration data 118. A second signal strength value 122(2) may be determined based on the communication between the wireless communication device 104 and the second destination device 106(2) using the default antenna 102. When the communication is complete, which may be indicated by a lack of data transmitted using the default antenna 102 for a threshold length of time, the switching circuitry 116 may be actuated to select the alternate antenna 102, which may be used to transmit test data to the second destination device 106(2). In other implementations, test data may be transmitted based on a selected time period, such as every 100 milliseconds, independent of the activity of the wireless communication device 104 using the first antenna 102(1). For example, if the second wireless radio 112(2) communicates using a Bluetooth protocol, the test data may include an empty poll packet. The measurement module 124 may determine a second signal strength value 122(2) based on the communication using the alternate antenna 102. The second signal strength values 122(2) associated with use of each antenna 102 by the second wireless radio 112(2) may be used to determine signal strength data 126. For example, the signal strength data 126 may be used to calculate a first average value or other mathematical value based on a fixed quantity of recent second signal strength values 122(2) associated with use of the second wireless radio 112(2) and first antenna 102(1) and a second average value or other mathematical value based on recent second signal strength values 122(2) associated with use of the second wireless radio 112(2) and the second antenna 102(2).

The configuration module 120 may modify the configuration data 118 associated with the second wireless radio 112(2) based on the associated signal strength data 126. For example, if the signal strength data 126 indicates that a greater signal strength is observed when using the second antenna 102(2) in conjunction with the second wireless radio 112(2), the configuration data 118 may be modified to indicate the second antenna 102(2) as the default antenna 102 for the second wireless radio 112(2). If the signal strength data 126 indicates that a greater signal strength is observed when using the first antenna 102(1) in conjunction with the second wireless radio 112(2), the configuration data 118 may be modified to indicate the first antenna 102(1) as the default antenna 102. On subsequent occasions when the second wireless radio 112(2) communicates data, the switching circuitry 116 may be actuated to select the current default antenna 102 for the second wireless radio 112(2) based on the configuration data 118.

Figure 2:
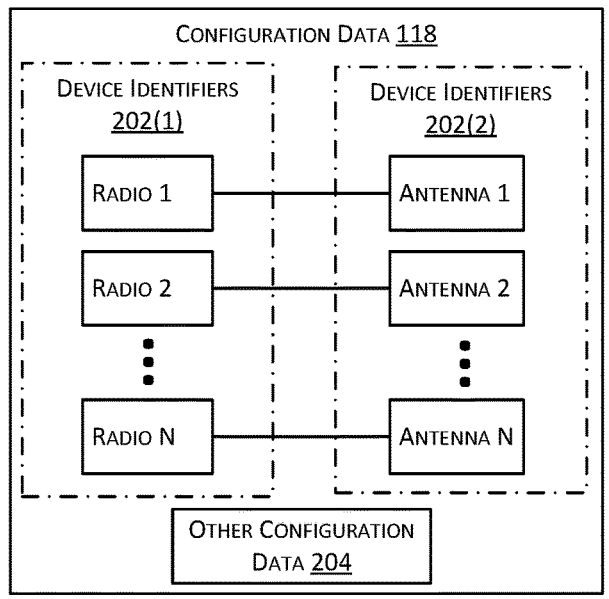
FIG. 2 is a block diagram depicting example implementations of configuration data and signal strength data.
Figure 2:
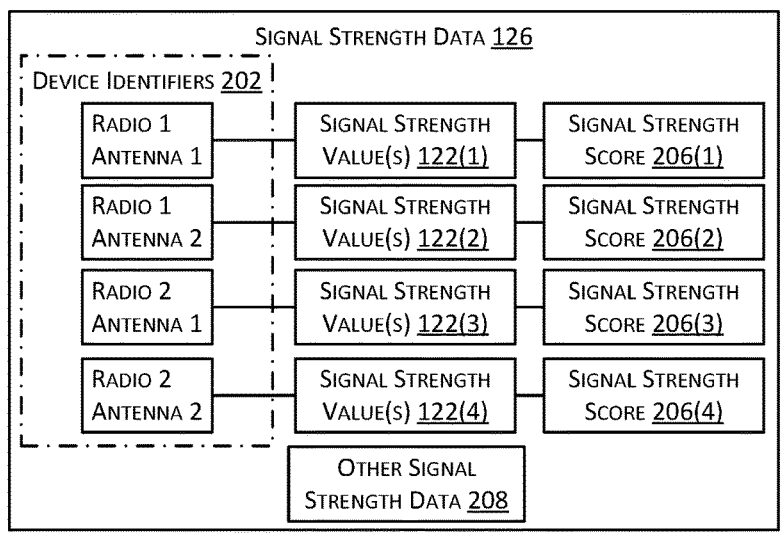

FIG. 2 is a block diagram 200 depicting example implementations of configuration data 118 and signal strength data 126. Configuration data 118 may indicate current default antennae 102 for use in conjunction with particular wireless radios 112 or wireless technologies. For example, as described with regard to FIG. 1, a wireless communication device 104 may include two or more wireless radios 112, each of which communicates using a different wireless technology, such as Wi-Fi or Bluetooth protocols. In other implementations, different wireless radios 112 may communicate using the same wireless technology, but the communication links 108 established by the wireless radios 112 may have different characteristics. For example, a Bluetooth protocol may be used to communicate with different destination devices 106. As another example, a Wi-Fi protocol may be used with different frequency bands. While FIG. 1 depicts a wireless communication device 104 having multiple wireless radios 112, in other implementations, a single wireless radio 112 may be configured to use multiple wireless technologies. For example, a wireless radio 112 may be operable to communicate using both Wi-Fi and Wi-Fi Direct protocols. As another example, a wireless radio 112 may be operable to communicate using both Bluetooth and Bluetooth Low Energy protocols.

For communications using a particular wireless radio 112 or wireless technology, a particular antenna 102 may be optimal. For example, when using a first wireless radio 112(1) to communicate data with a destination device 106, a greater signal strength may be observed if a first antenna 102(1) is used, compared to the signal strength observed when using a second antenna 102(2). The first antenna 102(1) may be designated as the default antenna 102(1) for the particular wireless technology. The configuration data 118 may indicate the optimal default antenna 102 for each wireless radio 112 or wireless technology. As such, the configuration data 118 may include first device identifiers 202(1) indicative of the wireless radios 112 of the wireless communication device 104. The first device identifiers 202 (1) may include any manner of alphanumeric data, image data, audio data, and so forth, that may be used to differentiate a particular wireless radio 112 from other devices. For example, the first device identifiers 202(1) may include device names, alphanumeric strings, network addresses associated with devices, and so forth. In some implementations, the first device identifiers 202(1) may include data that may be interpreted by a computing device that may not necessarily be understandable to a human user. The configuration data 118 may also include second device identifiers 202(2), indicative of the antennae 102 of the wireless communication device 104, stored in association with the first set of device identifiers 202(1). For example, each first device identifier 202(1) corresponding to a wireless radio 112 may be associated with a second device identifier 202(2) corresponding to an antenna 102. The second device identifier 202(2) may indicate the current default antenna 102 to be used in conjunction with the wireless radio 112 represented by the first device identifier 202(1).

Other configuration data 204 may include preselected default values or characteristics of particular antennae 102. For example, in some cases, signal strength data 126 for a particular wireless radio 112 may not be available. The other configuration data 204 may indicate that in cases where insufficient signal strength data 126 exists to determine a default antenna 102, the initial default antenna 102 will include the antenna 102 having the most omnidirectional radiation pattern. Other configuration data 204 may also include time data indicative of a period of time that limits the rate at which default antennae 102 may be changed for a wireless technology, to prevent hysteresis. For example, under some conditions, performance of two antennae 102 may be approximately equal. The other configuration data 204 may be used to prevent rapid switching of antennae 102 during communication by a wireless radio 112.

Other configuration data 204 may further include location data, orientation data, and so forth. For example, a wireless communication device 104 may include a portable device. Depending on the current location and orientation (e.g., rotation) of the wireless communication device 104, different antennae 102 may be optimal to communicate using a particular wireless technology. Continuing the example, if a laptop computer is placed on a first side of a building relative to a wireless access point, a first antenna 102(1) may achieve a greater signal strength than other antennae 102. However, if the computer is placed on a second side of the building, a second antenna 102(2) may achieve a greater signal strength. In some implementations, a location identifier may be stored in association with one or more of the second device identifiers 202(2) indicating a default antenna 102, and the antenna 102 selected by the switching circuitry 116 may be affected based on the current location or orientation of the wireless communication device 104. Other configuration data 204 may also include motion data. For example, a particular antenna 102 may achieve a greater signal strength while the wireless communication device 104 is in motion compared to other antennae 102.

Signal strength data 126 may include data indicative of signal strength values 122 determined for the communication of data using different combinations of wireless technologies and antennae 102. For example, as described with regard to FIG. 1, a wireless radio 112 may communicate data using a default antenna 102. However, periodically, during times when the wireless radio 112 is not communicating data with a destination device 106, the wireless radio 112 may also be used to communicate test data using one or more alternate antennae 102 of the wireless communication device 104. The signal strength values 122 for each combination of wireless radio 112 and antenna 102 may be stored as signal strength data 126. The signal strength data 126 may, in turn, be used to determine an optimal default antenna 102 for use with one or more of the wireless radios 112.

The signal strength data 126 may include multiple sets of signal strength values 122, each stored in association with device identifiers 202 indicating the wireless radio 112 and antenna 102 that was used to determine the respective set of signal strength values 122. For example, a first group of device identifiers 202(1) may identify the first wireless radio 122(1) and the first antenna 102(1). A first set of signal strength values 122(1) may include signal strength values 122(1) determined when the first antenna 102(1) was used to communicate data between the first wireless radio 112(1) and a destination device 106. Similarly, a second group of device identifiers 202(2) may indicate the first wireless radio 112(1) and the second antenna 102(2), which may be stored in association with a second set of signal strength values 122(2) determined when the second antenna 102(2), was used to communicate data between the first wireless radio 112(1) and a destination device 106. A third group of device identifiers 202(3), that indicate the second wireless radio 112(2) and the first antenna 102(1), may be stored in association with a third set of signal strength values 122(3). The third set of signal strength values 122(3) may be determined when the first antenna 102(1) was used to communicate data between the second wireless radio 112(2) and a destination device 106. A fourth group of device identifiers 202(4), that indicate the second wireless radio 112(2) and the second antenna 102(2), may be stored in association with a fourth set of signal strength values 122(4). The fourth set of signal strength values 122(4) may be determined when the second antenna 102(2) was used to communicate data between the second wireless radio 112(2) and a destination device 106.

In some implementations, the signal strength data 126 may also include one or more signal strength scores 206, which may be determined based on sets of signal strength values 122. For example, a signal strength score 206 for a particular wireless radio 112 and antenna 102 may include a moving average or other mathematical value that is calculated using at least a subset of the signal strength values 122 associated with that wireless radio 112 and antenna 102. Continuing the example, a first signal strength score 206(1) may include an average (e.g., a mean) determined based on the ten most recent first signal strength values 122(1) associated with use of the first wireless radio 112(1) and the first antenna 102(1). As additional first signal strength values 122(1) for the first wireless radio 112(1) and first antenna 102(1) are determined, the more recent first signal strength values 122(1) may replace the older first signal strength values 122(1) used to determine the first signal strength score 206(1). Thus, the first signal strength score 206(1) may change over time as conditions associated with the wireless communication device 104 or destination device 106 change. Similarly, a second signal strength score 206(2) may be determined based on the second set of signal strength values 122(2), a third signal strength score 206(3) may be determined based on the third set of signal strength values 122(3), and a fourth signal strength score 206(4) may be determined based on the fourth set of signal strength values 122(4). In other implementations, the signal strength scores 206 may include a mode, a median, or other mathematical values, such as a count of dropped or retransmitted data packets. For example, other signal strength data 208 may include one or more algorithms or weights used to calculate signal strength scores 206. Continuing the example, a signal strength score 206 may be determined based on one or more equations or algorithms in which particular signal strength values 122 are used as variables. In one implementation, the other signal strength data 208 may include time data indicating the times at which at least a subset of the signal strength values 122 were determined. An algorithm may include a series of weights applied to particular signal strength values 122, based on the time at which each signal strength value 122 was determined. For example, signal strength values 122 determined more recently may be provided with a greater weight than signal strength values 122 determined less recently.

In some implementations, the other signal strength data 208 may include one or more threshold values associated with differences between signal strength scores 206. In some cases, the threshold values may include an offset value used to determine when to modify configuration data 118 for a wireless technology. For example, configuration data 118 may be modified based on differences between signal strength scores 206. Continuing the example, the first signal strength score 206(1) may be indicative of a signal strength attainable using the first antenna 102(1) in conjunction with the first wireless radio 112(1), while the second signal strength score 206(2) may be indicative of a signal strength attainable using the second antenna 102(2) in conjunction with the first wireless radio 112(1). The difference between the first signal strength score 206(1) and second signal strength score 206(2) may indicate which of the antennae 102 is optimal for use with the first wireless radio 112(1), and the configuration data 118 may be modified to indicate the antenna 102 associated with the greater signal strength score 206. However, to prevent hysteresis and potential negative effects caused by rapid switching between default antennae 102, the other signal data 208 may include a threshold offset value, such as a constant (e.g., 2-3 decibels). If the difference between the first signal strength score 206(1) and second signal strength score 206(2) does not exceed the threshold offset value, the configuration data 118 may remain unmodified. However, if the difference between the first signal strength score 206(1) and second signal strength score 206(2) exceeds the threshold offset value, the configuration data 118 may be modified to indicate the antenna 102 associated with the greater signal strength score 206 as a new default antenna 102.

Figure 3:
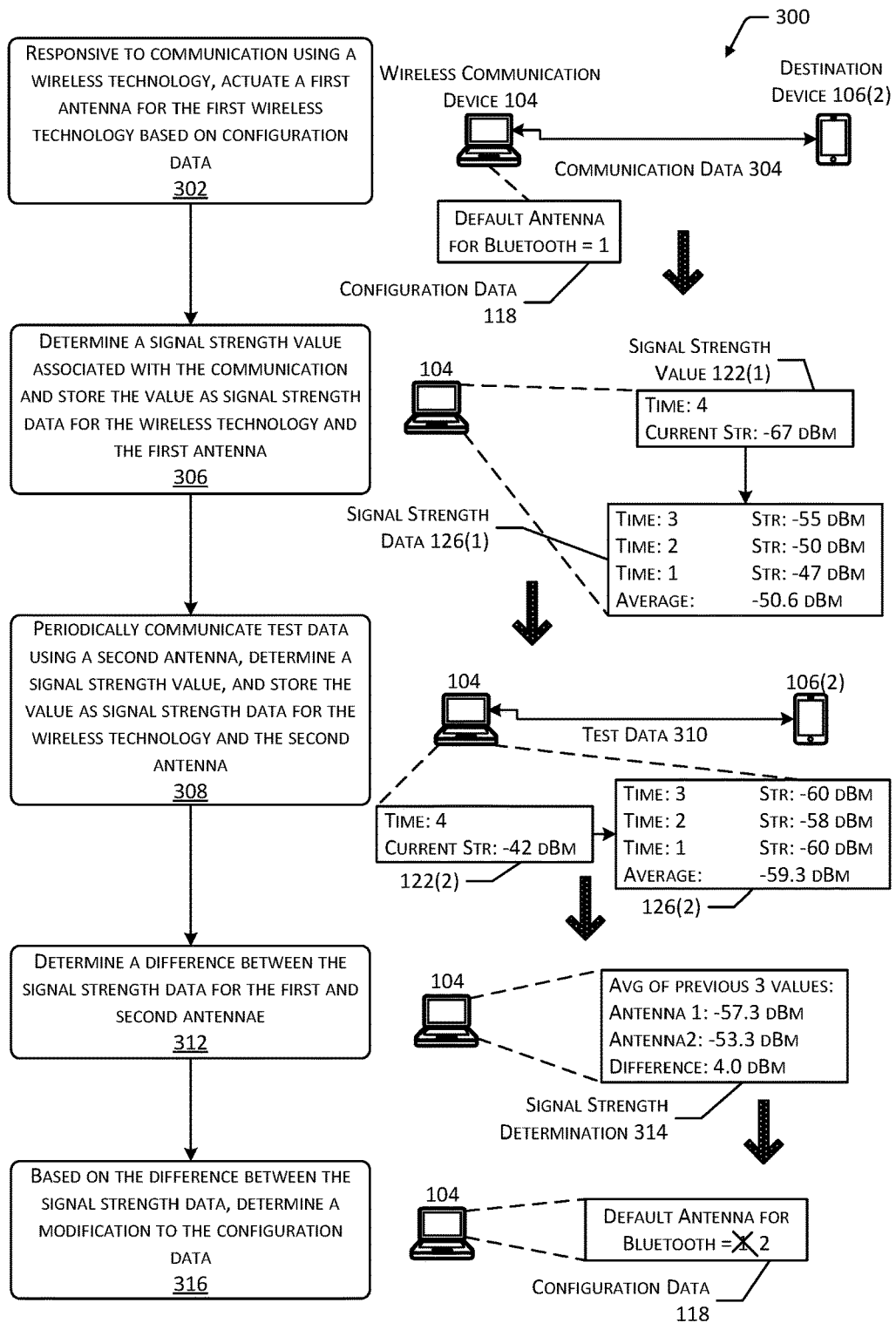
FIG. 3 is a scenario illustrating an implementation of a method for modifying configuration data based on signal strength data associated with antennae.

FIG. 3 is a scenario 300 illustrating a method for modifying configuration data 118 based on signal strength data 126 associated with antennae 102. At 302, a wireless communication device 104 may begin to communicate data with a destination device 106(2) using a wireless technology, such as by establishing a communication link 108 using a Bluetooth protocol. Responsive to communication using the wireless technology, a first antenna 102(1) of the wireless communication device 104 may be actuated based on configuration data 118. As described with regard to FIGS. 1 and 2, configuration data 118 may indicate a current default antenna 102 for use with a particular wireless technology. The default antenna 102 may be determined based on signal strength data 126 associated with the particular wireless technology and the antennae 102 of the wireless communication device 104. For example, if greater signal strength values 122 are observed when using the first antenna 102(1) compared to other antennae 102, the configuration data 118 may be set to indicate the first antenna 102(1) as the default antenna 102 when the particular wireless technology is used to communicate data. In some implementations, if there is insufficient signal strength data 126 to determine a default antenna 102, the configuration data 118 may indicate a preselected default antenna 102. For example, if a wireless communication device 104 includes multiple antennae 102, the preselected default antenna 102 for each wireless technology may include the antenna 102 having the most omnidirectional radiation pattern. The default antenna 102 may be used to transmit and receive communication data 304 to and from the destination device 106(2). Communication data 304 may include data associated with the purpose of the communication between the wireless communication device 104 and the destination device 106(2), such as payload data and accompanying metadata.

At 306, a signal strength value 122(1) associated with communication of the communication data 304 may be determined. For example, a measurement module 124 associated with the wireless communication device 104, the destination device 106(2), or another computing device in communication therewith, such as a server 110, may determine a strength associated with a communication link 108 between the wireless communication device 104 and a destination device 106(2). In some implementations, the determined signal strength value 122(1) may include a SNR or RSSI value. In other implementations, the determined signal strength value 122(1) may include a quality specific to the wireless technology used to communicate the communication data 304. For example, if the wireless technology includes a Bluetooth protocol, the signal strength value 122(1) may include an indication of the retransmission rate of the communication. As another example, if the wireless technology includes a Wi-Fi protocol, the signal strength value 122(1) may include an indication of a MCS or physical data rate. The signal strength value 122(1) may be stored as first signal strength data 126(1) associated with the wireless technology and the first antenna 102(1). As described with regard to FIGS. 1 and 2, signal strength data 126 may include signal strength values 122 previously determined for a particular wireless technology and antenna 102. FIG. 3 depicts example first signal strength data 126(1) associated with the wireless technology and the first antenna 102(1) that includes three signal strength values 122, determined at different times, and a signal strength score 206 of −50.6 dBm, which may be determined by calculating the average of the three signal strength values 122. FIG. 3 further depicts the current signal strength value 122(1) for communication between the wireless communication device 104 and the destination device 106(2) including a value of −67 dBm, which is less than the other values indicated in the signal strength data 126(1).

At 308, test data 310 may be communicated between the wireless communication device 104 and the destination device 106(2) using the second antenna 102(2). Test data 310 may include, for example, a single packet of data that may be used to measure a signal strength value 122 associated with transmission of the packet and receipt of a response from the destination device 106(2). For example, if the communication includes a Bluetooth protocol, the test data 310 may include a poll packet. As another example, if the communication includes a Wi-Fi protocol, the test data 310 may include a probe request packet. In other implementations, the test data 310 may include multiple data packets. The times at which the test data 310 is communicated may be determined based on a selected time period, such as once every one hundred milliseconds. In some implementations, the rate at which test data 310 is communicated using the second antenna 102(2) may vary based on factors affecting the wireless communication device 104. For example, if the wireless communication device 104 is currently moving, the time period at which test data 310 is communicated may be shorter than if the wireless communication device 104 is stationary. As another example, if the signal strength values 122 associated with the second antenna 102(2) are rapidly changing, which may be determined based on the difference between the current signal strength value 122 and one or more previous signal strength values 122 (e.g., a rate of change), the time period at which test data 310 is communicated may be shorter.

In some implementations, communication of the test data 310 using the second antenna 102(2) may be performed after determining that communication using the first antenna 102(1) is not occurring. For example, upon completion of a communication, the first antenna 102(1) or another component of the wireless communication device 104 may generate an indication that the communication has concluded. As another example, communication using the second antenna 102(2) may be delayed until the first antenna 102(1) is not in use. For example, if the first antenna 102(1) has not transmitted or received data for a threshold length of time, such as from one to three seconds, the second antenna 102(2) may then be used to transmit test data 310.

A signal strength value 122(2) associated with communication using the second antenna 102(2) may be determined and stored as signal strength data 126(2) associated with the wireless technology and second antenna 102(2). FIG. 3 depicts example signal strength data 126(2) associated with the second antenna 102(2) that includes three previously-determined signal strength values 122(2) and a signal strength score 206 of −59.3 dBm, which may be determined by calculating the average of the three signal strength values 122(2). FIG. 3 further depicts the current signal strength value 122(2) for communication using the second antenna 102(2) as −42 dBm, which is greater than the other signal strength values 122(2) of the signal strength data 126(2).

At 312, a difference between the first signal strength data 126(1) for the first antenna 102(1) and the second signal strength data 126(2) for the second antenna 102(2) may be determined. The wireless communication device 104 or another computing device in communication therewith may generate a signal strength determination 314 based on the signal strength data 126 for each antenna 102. For example, a first signal strength score 206(1) may be determined for the first antenna 102(1) based on the most recent three signal strength values 122(1) determined using the first antenna 102(1). Continuing the example, the first signal strength score 206(1) may include an average of the three most recent signal strength values 122(1) associated with communication using the first antenna 102(1). Because the most recently received signal strength value 122(1) of −67 dBm would be used in place of the oldest signal strength value 122 of −47 dBm, the first signal strength score 206(1) determined at 312 may be −57.3 dBm. A second signal strength score 206(2) may be determined for the second antenna 102(2) based on the most recently received three signal strength values 122(2) determined using the second antenna 102(2). Because the most recent signal strength value 112(2) of −42 dBm would be used in place of the oldest signal strength value of −60 dBm, the second signal strength score 206(2) determined at 312 may be −53.3 dBm. Thus, the second signal strength score 206(2) for the second antenna 102(2) would be greater than the first signal strength score 206(1) for the first antenna 102(1) by a difference of 4.0 dBm.

At 314, based on the difference between the signal strength data 126, a modification to the configuration data 118 may be determined. In some implementations, the configuration data 118 may remain unmodified. For example, if the first signal strength score 206(1) for the first antenna 102(1) is greater than the second signal strength score 206(2) for the second antenna 102(2), the first antenna 102(1) may remain the default antenna 102 for use with the wireless technology, and the configuration data 118 may remain unmodified. However, if the second signal strength score 206(2) for the second antenna 102(2) exceeds the first signal strength score 206(1) for the first antenna 102(1), this may indicate that a superior signal strength may be achieved by using the second antenna 102(2) as the default antenna 102 when communicating using the wireless technology. If the second signal strength score 206(2) exceeds the first signal strength score 206(1) by more than a threshold hysteresis value, the configuration data 118 may be modified to indicate the second antenna 102(2) as the default antenna 102 for use with the wireless technology, such that subsequent attempts to communicate data using the wireless technology may cause the second antenna 102(2) to be utilized.

The method depicted in FIG. 3 may be used for other wireless technologies used by the wireless communication device 104 as well. For example, additional configuration data 118 may indicate the default antenna 102 for use with other wireless technologies. Additional signal strength data 126 may indicate previous signal strength values 122 determined for each antenna 102, used in conjunction with each wireless technology. The signal strength data 126 may be used to modify the configuration data 118 for the other wireless technologies in a manner similar to that described with regard to FIG. 3.

Figure 4:
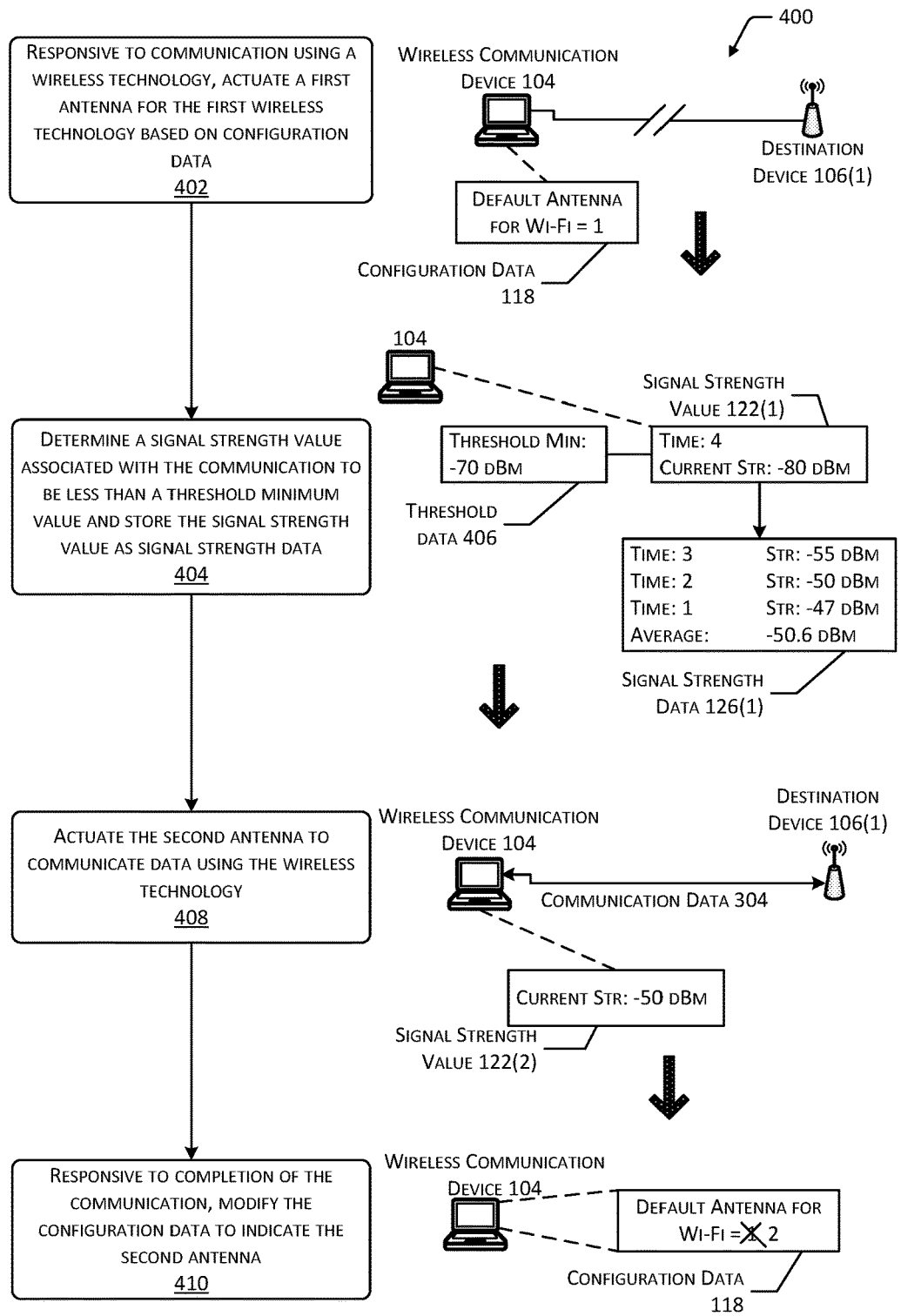
FIG. 4 is a scenario illustrating a method for modifying configuration data based on a threshold value.

FIG. 4 is a scenario 400 illustrating a method for modifying configuration data 118 based on a threshold value. At 402, responsive to a communication using a wireless technology, a first antenna 102(1) of a wireless communication device 104 may be actuated. The first antenna 102(1) may include a default antenna 102 for use with the particular wireless technology, which may be indicated by configuration data 118. For example, the wireless communication device 104 may attempt to communicate with a first destination device 106(1), such as an access point, using a Wi-Fi protocol. The configuration data 118 may indicate that the first antenna 102(1) of the wireless communication device 104 is the current default antenna 102 for use with Wi-Fi communications.

At 404, a signal strength value 122(1) associated with the communication between the wireless communication device 104 and the destination device 106(1) may be determined to be less than a threshold minimum signal strength value. For example, a current signal strength value 122(1) of the communication may be determined to be −80 dBm, while threshold data 406 stored in association with the wireless communication device 104 may indicate a threshold minimum value of −70 dBm. A signal strength value 122(1) less than a threshold minimum value may indicate a deficiency in the communication link 108 between the wireless communication device 104 and the destination device 106(1). For example, if one or more of the wireless communication device 104 or the destination device 106(1) has been moved to a different location or if one or more objects that may interfere with the communication have been placed proximate one of the devices, this may negatively impact the determined signal strength value 122(1). The current signal strength value 122(1) may be stored as first signal strength data 126(1) associated with the wireless technology and the first antenna 102(1).

In other implementations, failure of the wireless communication device 104 to exchange data with the destination device 106(1) may be determined. For example, the threshold data 406 may include a quantity or percentage of dropped data packets or data packets to which no response is received (e.g., a missed response) from the first destination device 106(1). If a count or percentage of dropped data packets or data packets for which no response is received exceeds a threshold quantity or percentage, this may indicate a deficiency in the communication link 108 between the wireless communication device 104 and the destination device 106(1). In some implementations, if no signal strength value 122 associated with the communication is able to be determined, a fixed value, such as −100, may be added to the signal strength data 126(1) that may reduce the signal score 206 associated with the signal strength data 126(1).

At 408, the second antenna 102(2) of the wireless communication device 104 may be actuated to communicate data using the particular wireless technology. For example, if communication using the first antenna 102(1) is not possible, unreliable, or if communication using the first antenna 102(1) is only possible at a slow rate, the wireless communication device 104 may attempt communication using the second antenna 102(2). If communication with the second antenna 102(2) is possible, with a superior signal strength value 122(2), at 410, responsive to completion of the communication, the configuration data 118 may be modified to indicate the second antenna 102(2).

Figure 5:
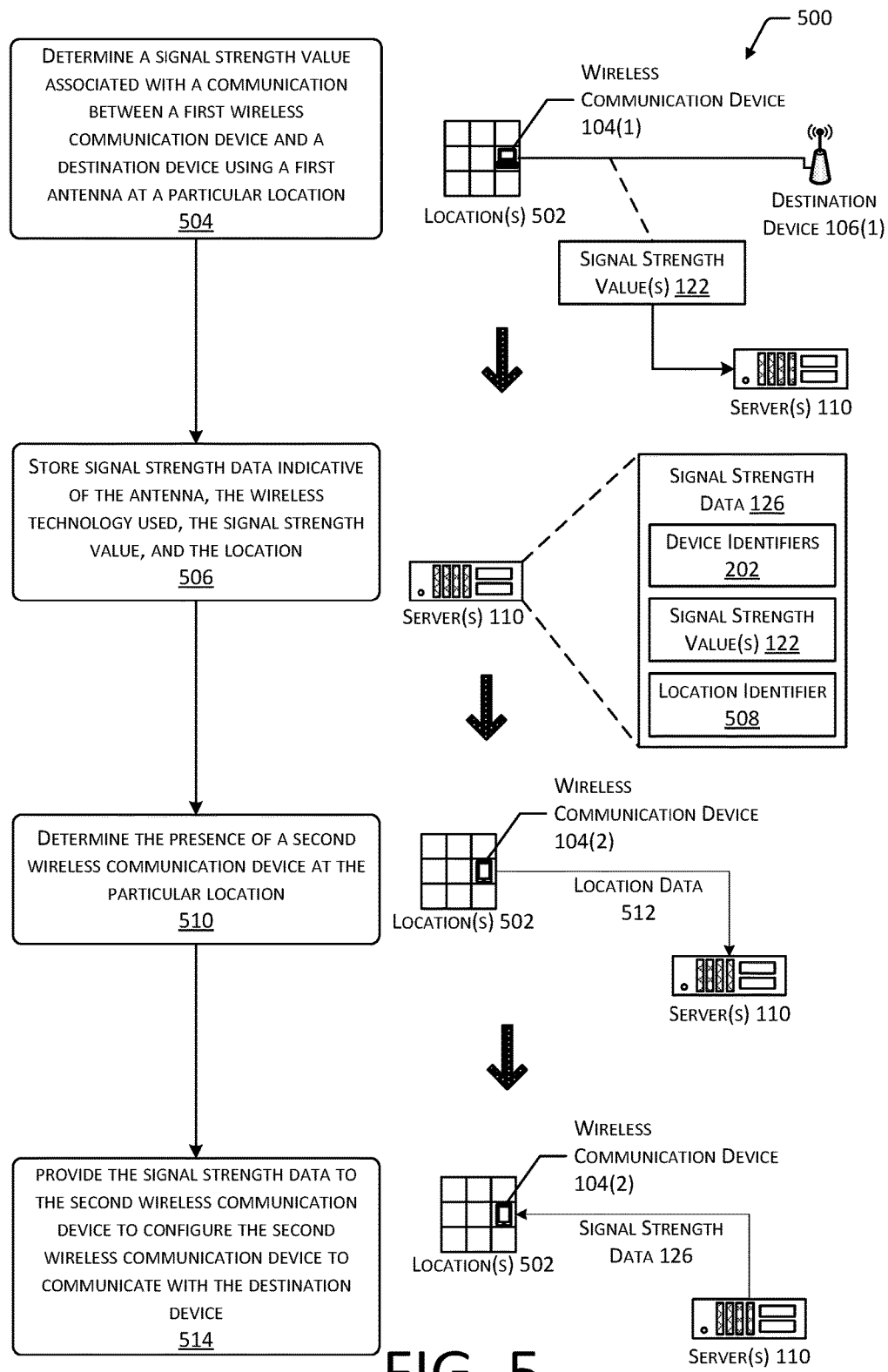
FIG. 5 is a scenario illustrating an implementation of a method for configuring a device based on signal strength data associated with a location.

FIG. 5 is a scenario 500 illustrating a method for configuring a device based on signal strength data 126 associated with a location 502. At 504, one or more signal strength values 122 associated with communication between a first wireless communication device 104(1) and a destination device 106(1), using an antenna 102, may be determined. The wireless communication device 104(1) may initiate communication with the first destination device 106(1) from a particular location 502. For example, the location 502 may include a coordinate location, a particular structure, a particular room within a structure, a particular location within a room, such as the location of a cubicle or a docking station for a computing device, and so forth. The location 502 of the wireless communication device 104(1) may be determined using a location sensor associated with one or more of the wireless communication device 104(1) or the location 502. The signal strength value(s) 122 may be determined by a measurement module 124 associated with the wireless communication device 104 or with another computing device in communication therewith, such as one or more servers 110.

At 506, signal strength data 126 indicative of the antenna 102 used by the wireless communication device 104, the wireless technology used, the signal strength value(s) 122, and the location 502 may be stored. For example, the signal strength data 126 may include one or more device identifiers 202 indicating the wireless technology and antenna 102 used to communicate with the destination device 106(1), the signal strength value(s) 122, and a location identifier 508 indicative of the location 502 of the wireless communication device 104 during the communication. In some implementations, a server 110 or another data storage medium remote from the wireless communication device 104 may be used to store the signal strength data 126. In other implementations, the wireless communication device 104 may store the signal strength data 126.

At 510, the presence of a second wireless communication device 104(2) at the particular location 502 may be determined. For example, a server 110 or other computing device may receive location data 512 from a location sensor associated with the second wireless communication device 104(2). As another example, one or more devices at the location 502 may determine the presence of the second wireless communication device 104(2). Continuing the example, a device may detect coupling between the second wireless communication device 104(2) and one or more electrical or communication ports at the location 502 to determine presence of the second wireless communication device 104(2). Alternatively or additionally, access to one or more communication networks at the location 502 by the second wireless communication device 104(2) may be detected, which may indicate the presence of the second wireless communication device 104(2) at the location 502.

At 514, the signal strength data 126 may be provided to the second wireless communication device 104(2) to configure the second wireless communication device 104(2) to communicate with the destination device 106(1). For example, the second wireless communication device 104(2) may be configured to communicate using the same or similar wireless technologies and antennae 102 having the same or similar characteristics as the first wireless communication device 104(1). In such cases, configuration data 118 based on the signal strength data 126 of the first wireless communication device 104(1) may be used to determine the default antenna 102 for use by the second wireless communication device 104(2) to obtain a greater signal strength when communicating with the first destination device 106(1).

Figure 6:
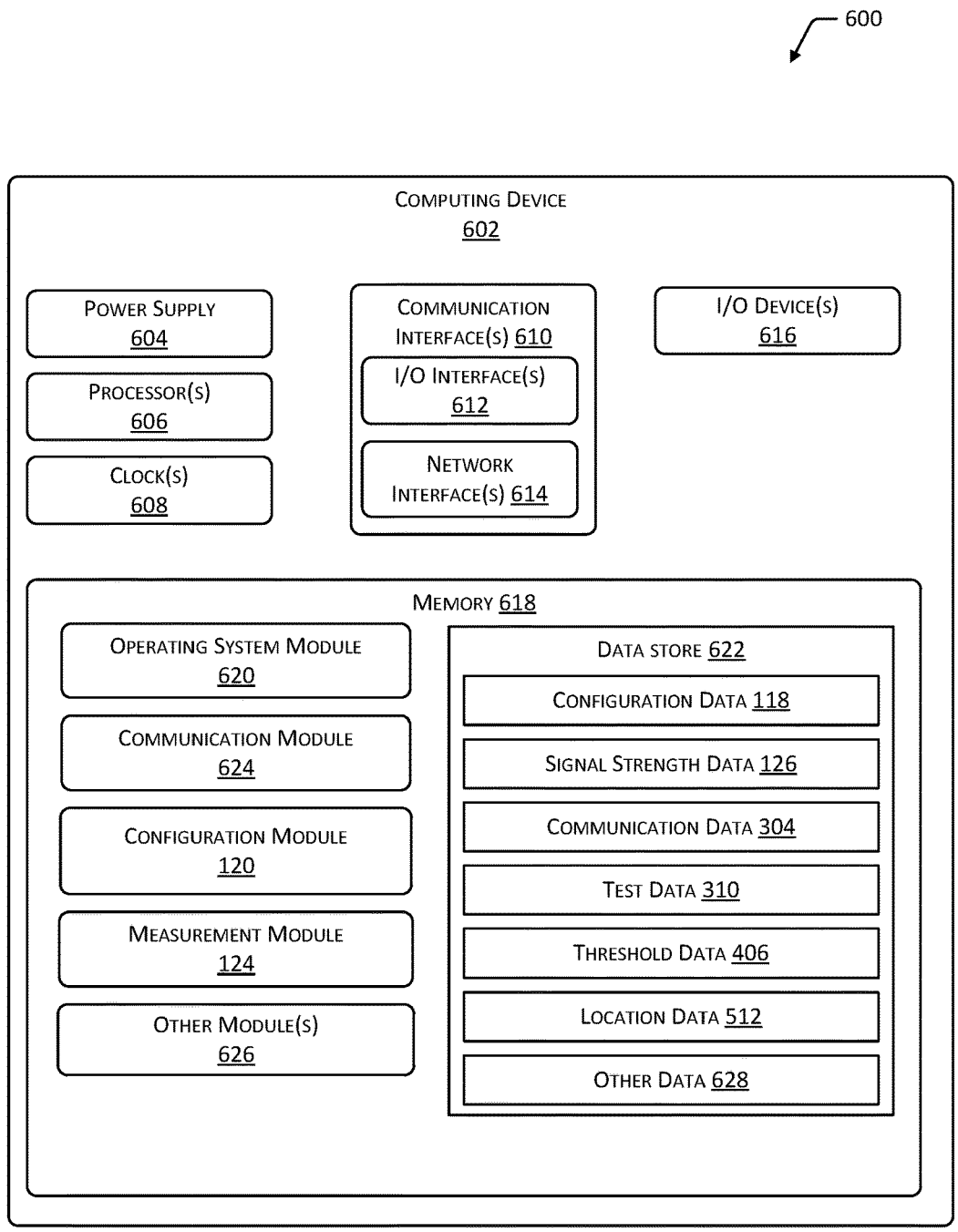
FIG. 6 is a block diagram illustrating an example computing device within the scope of the present disclosure.

FIG. 6 is a block diagram 600 illustrating a computing device 602 within the scope of the present disclosure. The computing device 602 may include one or more wireless communication devices 104. In other implementations, one or more of the functions performed by the computing device 602 may be performed by one or more destination devices 106, servers 110, or other computing devices 602 in communication with one or more wireless communication devices 104.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth. Continuing the example, data from the clock 608 may be used to determine when signal strength values 122 are determined relative to other signal strength values 122, when threshold lengths of time have lapsed, when to determine signal strength values 122 for an alternate antenna 102 based on a selected time period, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components thereof. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O devices 616 may be physically incorporated with a computing device 602 or may be externally placed.

The network interfaces 614 may be configured to provide communications between the computing device 602 and other devices, such as the I/O devices 616, routers, access points, wireless communication devices 104, destination devices 106, and so forth. The network interfaces 614 may include devices configured to couple to one or more networks including local area networks (LANs), wireless LANs, wide area networks (WANs), wireless WANs, and so forth. For example, the network interfaces 614 may include computing devices 602 compatible with Ethernet, Wi-Fi, Wi-Fi Direct, Bluetooth, Bluetooth Low Energy, ZigBee, Z-Wave, 3G, 4G, LTE, and so forth. Continuing the example, as shown in FIG. 1, the computing device 602 may include one or more wireless radios 112, one or more antennae 102, switching circuitry 116 for selecting particular antenna 102, components associated with a radio frequency chain 114, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communications with destination devices 106, servers 110, wireless communication devices 104, or other computing devices 602.

The memory 618 may also store the configuration module 120. The configuration module 120 may generate or modify configuration data 118 indicative of antennae 102 to be used as default antennae 102 for particular wireless technologies. The configuration data 118 may be determined based on signal strength data 126 that may indicate signal strength values 122 observed during use of particular combinations of antennae 102 and wireless technologies. In some implementations, the configuration module 120 may be used to actuate switching circuitry 116 to select a particular antenna 102 for use. In other implementations, the switching circuitry 116 or another module may access the configuration data 118 for selection of an antenna 102.

The memory 618 may additionally store the measurement module 124. The measurement module 124 may determine signal strength values 122 during communication between computing devices 602 and determine signal strength data 126 based on the signal strength values 122. In some implementations, the signal strength data 126 may also include location data 512 indicative of a location 502 associated with a communication. The measurement module 124 may also determine completion of communication using a default antenna 102 such as by a lapse of a length of time indicated in threshold data 406 during which no communication occurs using the first antenna 102(1). During times when a default antenna 102 is not in use, the measurement module 124 may determine a signal strength value 122 associated with one or more alternate antennae 102 on a periodic basis.

Other modules 626 may also be present in the memory 618. For example, encryption modules may be used to encrypt and decrypt communications between computing devices 602. The other modules 626 may also include modules for receiving user input to configure parameters of wireless communication devices 104, set threshold values of the threshold data 406, manually modify the default antenna 102, and so forth.

Other data 628 within the data store 622 may include user input data, such as configurations and settings associated with computing devices 602. Other data 628 may also include security data, such as encryption keys and schema, access credentials, and so forth.

In different implementations, different computing devices 602 may have different capabilities or capacities. For example, servers 110 may have significantly more processor 606 capability and memory 618 capacity compared to the processor 606 capability and memory 618 capacity of destination devices 106 or wireless communication devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
a wireless electronic device having a plurality of antennae and switching circuitry for selecting particular antennae of the plurality of antennae, wherein the wireless electronic device is operable to communicate using at least a first wireless protocol and a second wireless protocol;

one or more memories storing computer-executable instructions; and one or more hardware processors, to execute the computer-executable instructions to:
- receive a request to communicate first data using the first wireless protocol;
- access first configuration data indicating a first antenna associated with communication using the first wireless protocol;
- based on the first configuration data, actuate the switching circuitry to select the first antenna;
- communicate the first data using the first wireless protocol using the first antenna;
- determine a first signal strength value associated with communication using the first wireless protocol and the first antenna;
- determine completion of communication of the first data;
- actuate the switching circuitry to select a second antenna;
- communicate first test data using the first wireless protocol and the second antenna;
- determine a second signal strength value associated with communication using the first wireless protocol and the second antenna;
- receive a request to communicate second data using the second wireless protocol;
- access second configuration data indicating one of the first antenna or the second antenna associated with communication using the first wireless protocol;
- actuate the switching circuitry to select the one of the first antenna or the second antenna;
- communicate the second data using the second wireless protocol and the one of the first antenna or the second antenna;
- determine a third signal strength value associated with communication using the second wireless protocol and the one of the first antenna or the second antenna;
- determine completion of communication of the second data;
- actuate the switching circuitry to select an other of the first antenna or the second antenna;
- communicate second test data using the second wireless protocol and the other of the first antenna or the second antenna;
- determine a fourth signal strength value associated with communication using the second wireless protocol and the other of the first antenna or the second antenna; and
- based on one or more of the first signal strength value, the second signal strength value, the third signal strength value, or the fourth signal strength value, modify one or more of the first configuration data or the second configuration data.

2. The system of claim 1, further comprising computer-executable instructions to:
- determine first signal strength data indicative of a fixed count of previous signal strength values associated with communication using the first wireless protocol and the first antenna;
- based on the first signal strength data, determine a first signal strength score;
- determine second signal strength data indicative of a fixed count of previous signal strength values associated with communication using the first wireless protocol and the second antenna;
- based on the second signal strength data, determine a second signal strength score; and
- determine a difference between the first signal strength score and the second signal strength score;
- wherein the first configuration data is modified based on the difference.

3. The system of claim 1, further comprising computer-executable instructions to:
- determine the first signal strength value to be less than a threshold signal strength; and
- modify the first configuration data to indicate the second antenna.

4. The system of claim 1, further comprising computer-executable instructions to:
- determine, during communication of the first data using the first wireless protocol and the first antenna, one or more of:
  - a count of dropped data packets in excess of a threshold count;
  - a count of missed responses to data packets in excess of the threshold count;
  - a percentage of dropped data packets in excess of a threshold percentage;
  - a percentage of missed responses to data packets in excess of the threshold percentage;
  - a signal strength value less than a threshold minimum signal strength value; or
  - a data transfer rate less than a threshold rate;
- actuate the switching circuitry to select the second antenna;
- communicate the first data using the first wireless protocol and the second antenna;
- determine successful communication of the first data using the first wireless protocol and the second antenna; and
- modify the first configuration data to indicate the second antenna.

5. The system of claim 1, wherein the computer-executable instructions to communicate the first test data include computer-executable instructions to:
- determine a period of time associated with the first wireless protocol and the second antenna; and
- actuate the switching circuitry to select the second antenna, communicate the first test data, and determine the second signal strength value periodically, based on the period of time.

6. The system of claim 5, further comprising a movement sensor and computer-executable instructions to:
- determine movement of the wireless electronic device using the movement sensor; and
- determine the period of time based on a rate associated with the movement.

7. The system of claim 1, further comprising a location sensor and computer-executable instructions to:
- determine a location of the wireless electronic device using the location sensor; and
- store an indication of the location in association with the first configuration data.

8. The system of claim 7, further comprising computer-executable instructions to:
- responsive to the request to communicate the first data using the first wireless protocol, determine a current location of the wireless electronic device using the location sensor; and
- wherein the switching circuitry is actuated to select the first antenna based in part on correspondence between the current location and the indication of the location stored in association with the first configuration data.

9. The system of claim 1, wherein the computer-executable instructions to determine the first signal strength value include computer-executable instructions to determine one or more of a modulation and coding scheme or a physical data rate associated with communication using the first wireless protocol.

10. The system of claim 1, wherein the computer-executable instructions to determine the second signal strength value include computer-executable instructions to determine a retransmission rate associated with communication using the second wireless protocol.

11. A system comprising:
a first wireless radio;
a second wireless radio;
a first antenna;
a second antenna;
one or more memories storing computer-executable instructions; and
one or more hardware processors to execute the computer-executable instructions to:
determine first configuration data that is indicative of the first antenna;
communicate first data using the first wireless radio and the first antenna as indicated by the first configuration data;
determine a first signal strength value associated with communication of the first data using the first wireless radio and the first antenna;
communicate second data using the first wireless radio and the second antenna;
determine a second signal strength value associated with communication of the second data using the first wireless radio and the second antenna;
determine that the second signal strength value is greater than the first signal strength value;
in response to the second signal strength value being greater than the first signal strength value, determine second configuration data that is indicative of the second antenna;
access third configuration data associating the second wireless radio with one of the first antenna or the second antenna;
communicate third data using the second wireless radio and the one of the first antenna or the second antenna as indicated by the third configuration data;
determine a third signal strength value associated with communication using the second wireless radio and the one of the first antenna or the second antenna; and
determine, based on the third configuration data, fourth configuration data that associates the second wireless radio with the one of the first antenna or the second antenna.

12. The system of claim 11, further comprising computer-executable instructions to:
receive a request to communicate the second data using the first wireless radio, wherein the second data includes test data for determining the second signal strength value using the second antenna.

13. The system of claim 11, further comprising computer-executable instructions to:
communicate fourth data using the second wireless radio and a different one of the first antenna or the second antenna;
determine a fourth signal strength value associated with communication using the different one of the first antenna or the second antenna;
determine that the fourth signal strength value is greater than the third signal strength value; and
generate the fourth configuration data based on the third configuration data, the fourth configuration data to associate the second wireless radio with the different one of the first antenna or the second antenna.

14. The system of claim 13, wherein the first wireless radio communicates with a first wireless protocol and the second wireless radio communicates with a second wireless protocol, the computer-executable instructions to determine the first signal strength value include computer-executable instructions to determine one or more of a modulation and coding scheme or a physical data rate associated with communication using the first wireless radio, and the computer-executable instructions to determine the third signal strength value include computer-executable instructions to determine a retransmission rate associated with communication using the second wireless radio.

15. The system of claim 11, further comprising computer-executable instructions to:
determine one or more of: a location of the first wireless radio, movement of the first wireless radio, or a rate of movement of the first wireless radio;
wherein the second data is communicated in response to the location, the movement, or the rate of movement to determine the second signal strength value.

16. A system comprising:
a wireless electronic device operable to communicate using at least a first wireless protocol and a second wireless protocol;
a first antenna;
a second antenna;
one or more memories storing computer-executable instructions; and
one or more hardware processors to execute the computer-executable instructions to:
determine first configuration data that is indicative of the first antenna;
communicate first data using the first wireless protocol and the first antenna as indicated by the first configuration data;
determine a first signal strength value associated with communication of the first data using the first wireless protocol and the first antenna;
communicate second data using the first wireless protocol and the second antenna;
determine a second signal strength value associated with communication of the second data using the first wireless protocol and the second antenna;
based on the first signal strength value and the second signal strength value, determine second configuration data that associates a second wireless protocol with one of the first antenna or the second antenna; and
communicate third data using the second wireless protocol and the one of the first antenna or the second antenna.

17. The system of claim 16, further comprising computer-executable instructions to:
receive a request to communicate the second data using the first wireless protocol, wherein the second data includes test data for determining the second signal strength value.

18. The system of claim 16, further comprising computer-executable instructions to:
- determine a third signal strength value associated with communication using the second wireless protocol and the one of the first antenna or the second antenna;
- communicate fourth data using the second wireless protocol and a different one of the first antenna or the second antenna;
- determine a fourth signal strength value associated with communication using the second wireless protocol and the different one of the first antenna or the second antenna; and
- based on the third signal strength value and the fourth signal strength value, modify the second configuration data.

19. The system of claim 16, further comprising computer-executable instructions to:
- determine, during communication of the first data using the first wireless protocol and the first antenna, one or more of:
  - a count of dropped data packets in excess of a threshold count;
  - a count of missed responses to data packets in excess of the threshold count;
  - a percentage of dropped data packets in excess of a threshold percentage;
  - a percentage of missed responses to data packets in excess of the threshold percentage;
  - a signal strength value less than a threshold minimum signal strength value; or
  - a data transfer rate less than a threshold rate;
- communicate the first data using the first wireless protocol and the second antenna;
- determine successful communication of the first data using the first wireless protocol and the second antenna; and
- modify the first configuration data to indicate the second antenna.

20. The system of claim 16, further comprising computer-executable instructions to:
- determine a location of the wireless electronic device, wherein the first configuration data associates the location with the first antenna; and
- determine correspondence between the location and the first configuration data, wherein the first data is communicated using the first antenna in response to the correspondence.

* * * * *